May 4, 1926.

E. PRICE ET AL

COMBINATION VALVE

Filed Sept. 16, 1925

1,583,173

INVENTOR.
Emil Price
BY William A. Pfister
ATTORNEYS.

Patented May 4, 1926.

1,583,173

UNITED STATES PATENT OFFICE.

EMIL PRICE AND WILLIAM A. PFISTER, OF LOS ANGELES, CALIFORNIA.

COMBINATION VALVE.

Application filed September 16, 1925. Serial No. 56,660.

*To all whom it may concern:*

Be it known that we, EMIL PRICE and WILLIAM A. PFISTER, both citizens of the United States, and residents of Los Angeles, county of Los Angeles, and State of California, have jointly invented new and useful Improvements in Combination Valves, of which the following is a specification.

This invention relates to a combination faucet fixture adapted to be connected to two sources of supply of liquid and to deliver therefrom through a common discharge. The present invention is adapted to span and connect parallel service pipes, and to be self-adjustable within limits so as to adapt the fixture to be connected to pipes which are spaced apart distances which may vary. It is common plumbing practice to bring horizontal parallel service pipes through walls or plates, one being connected to the cold water supply and the other to the hot water supply. It is standard practice to locate these pipes on eight-inch centers. A combination faucet having a common spout and valve at the junction of the hot and cold water branches for controlling the discharge of water is then connected to the pipes. However, the pipes are usually not accurately located on the specified centers, and the result is that the pipes must be bent or twisted to make the connection. Faucets have been connected in such positions by providing links which are connected by swivels to a combination faucet, the links serving as couplings to connect the faucet to the pipes.

The present invention has for its primary object the provision of a fixture wherein a pair of faucets are connected to the pipes and are joined by a combination spout which is swivelled to the faucets. Another object of this invention is to provide such a fixture with a combination spout which comprises a bridge member and a reversible spout. In addition to the broader objects of this invention, there are certain details of design and structure, whereby an economical, easily installed and ornate fixture may be obtained.

These objects, together with other objects and corresponding accomplishments are obtained by means of the embodiment of our invention illustrated in the accompanying drawings, in which.

Figure 3:
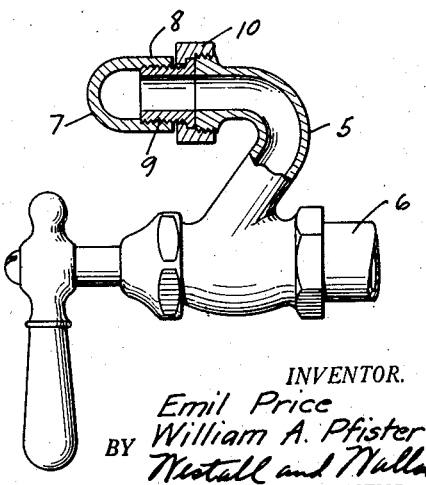
Fig. 3 is a section as seen on the lines 3—3 of Fig. 1.

Referring more particularly to the drawings, faucets of the pantry type having gooseneck spouts are indicated by 5. Supply pipes for the hot and cold water extend horizontally through the wall or stationary support and the faucets are mounted thereon. One of the supply pipes is indicated by 6 in Fig. 3. A bridge member 7 joins the spout ends of the faucets. The bridge is formed at its ends with laterally turned inlets 8 which are internally threaded to receive coupling members 9. Union collars 10 in association with the coupling members 9 secure the bridge 7 and the faucets, providing a swivel connection.

Figure 4:
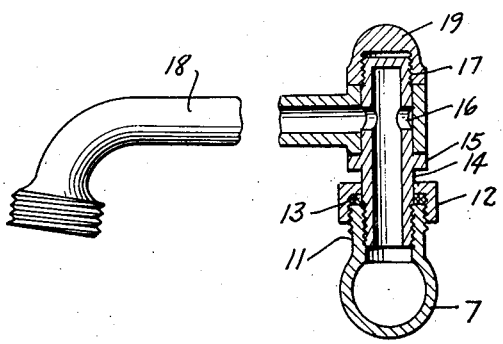
Fig. 4 shows the spout and bridge reversed.

Extending laterally from bridge member 7 and at right-angles to the inlets 8 is a discharge outlet 11 which is externally threaded to receive a union collar 12. Packing 13 is provided between the end of the discharge extension and the collar. The extension is also internally threaded to receive a nipple 14 which is provided with a flange 15 located intermediate its ends and is closed at the outer end except for lateral ports 16. The outer end of the nipple is externally threaded to receive a cap nut. Pivotally mounted upon the nipple 14 and on the outer end thereof so as to abut the flange 15 is a spout 18. A passage in the spout registers with the ports 16 and the spout is pivotally held in position by means of the cap nut 19. This provides a connection such that the spout may be swung laterally so as to direct the discharge of water as desired. If for any reason it is desired to raise the discharge spout, the bridge member 7 is reversed so that the discharge is on the upper side as indicated in Fig. 4. The parts are then connected as shown therein.

Figure 1:
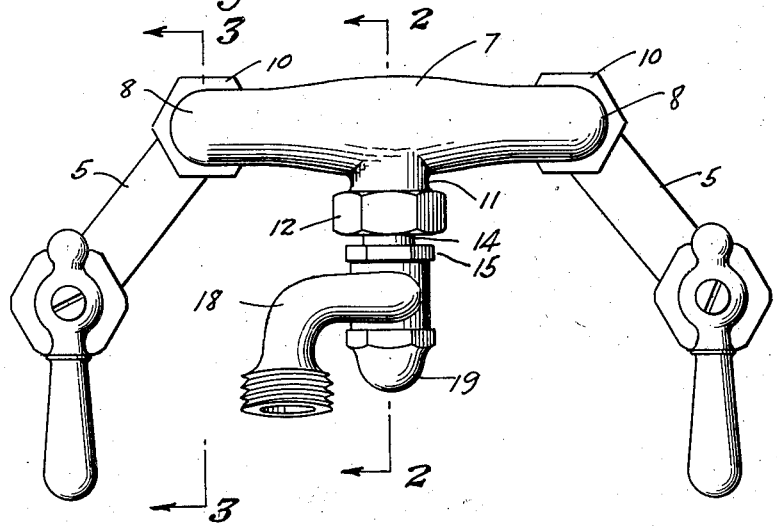
Fig. 1 is a front elevation of a complete fixture.
Figure 2:
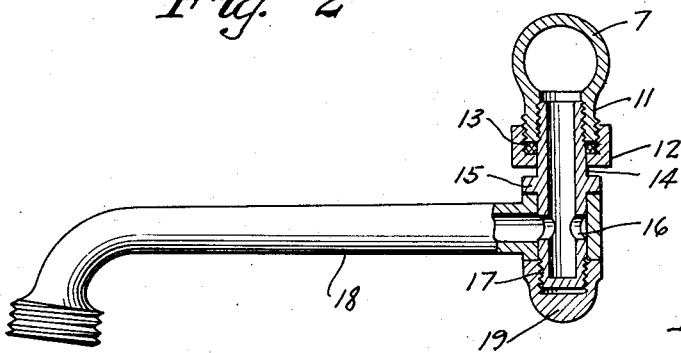
Fig. 2 is a section as seen on the lines 2—2 of Fig. 1.

In installing the fixture, faucets 5 are mounted upon the supply pipe and the bridge 7 connected thereto. The construction is such as to permit a variation in the distance between the supply pipes. The bridge is mounted in either the position shown in Fig. 2 or that shown in Fig. 4 depending upon the height at which it is desired to place the spout. The spout is then mounted in position and the fixture is ready for use.

What we claim is:

1. A fixture of the character described comprising the combination of faucets having connections for spaced parallel service pipes, said faucets having goose neck spouts and valve stems coaxial with said connections, handles for said stems, and a bridge member provided with a discharge spout joining said faucets and connected to said faucet spouts by swivel connections.

2. A fixture of the character described comprising the combination of faucets adapted to be connected to spaced parallel service pipes, a bridge member joining said faucets and connected thereto by swivel connections, said bridge member having a lateral discharge extension, and a reversible spout connected to said extension.

3. A fixture of the character described comprising the combination of faucets adapted to be connected to spaced parallel service pipes, a bridge member joining said faucets and connected thereto by swivel connections, said bridge member having a lateral discharge extension, a nipple connected to said extension, said nipple being closed at its outer end and having lateral discharge ports, and a spout having a lateral nipple receiving bore at the end pivotally mounted on said nipple.

4. A fixture of the character described comprising the combination of faucets adapted to be connected to spaced parallel service pipes, said faucets having goose neck spouts, a bridge member joining said faucets and connected to said faucet spouts by swivel connections, said bridge member having a lateral discharge extension, and a reversible spout connected to said extension.

5. A fixture of the character described comprising the combination of faucets adapted to be connected to spaced parallel service pipes, said faucets having goose neck spouts, a bridge member joining said faucets and connected to said faucet spouts by swivel connections, said bridge member having a lateral discharge extension, a nipple connected to said extension, said nipple being closed at its outer ends and having lateral discharge ports, and a spout having a lateral nipple receiving bore at the ends pivotally mounted on said nipple.

In witness that we claim the foregoing we have hereunto subscribed our names this 10th day of September, 1925.

EMIL PRICE.
WILLIAM A. PFISTER.